United States Patent
Le Leannec et al.

(10) Patent No.: US 12,495,160 B2
(45) Date of Patent: Dec. 9, 2025

(54) TEMPLATE MATCHING PREDICTION FOR VERSATILE VIDEO CODING

(71) Applicant: INTERDIGITAL CE PATENT HOLDINGS, SAS, Paris (FR)

(72) Inventors: Fabrice Le Leannec, Betton (FR); Karam Naser, Mouazé (FR); Tangi Poirier, Thorigné-Fouillard (FR); Franck Galpin, Thorigne-Fouillard (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 52 days.

(21) Appl. No.: 18/028,333

(22) PCT Filed: Sep. 20, 2021

(86) PCT No.: PCT/EP2021/075838
§ 371 (c)(1),
(2) Date: Mar. 24, 2023

(87) PCT Pub. No.: WO2022/063729
PCT Pub. Date: Mar. 31, 2022

(65) Prior Publication Data
US 2023/0396805 A1 Dec. 7, 2023

(30) Foreign Application Priority Data

Sep. 28, 2020 (EP) ..................................... 20306105
Dec. 15, 2020 (EP) ..................................... 20306564
Feb. 24, 2021 (EP) ..................................... 21305219

(51) Int. Cl.
*H04N 19/00* (2014.01)
*H04N 19/103* (2014.01)
(Continued)

(52) U.S. Cl.
CPC ............ *H04N 19/61* (2014.11); *H04N 19/103* (2014.11); *H04N 19/12* (2014.11); *H04N 19/159* (2014.11);
(Continued)

(58) Field of Classification Search
CPC ...... H04N 19/61; H04N 19/103; H04N 19/12; H04N 19/159; H04N 19/176; H04N 19/186; H04N 19/189; H04N 19/70
See application file for complete search history.

(56) References Cited

U.S. PATENT DOCUMENTS

2017/0339404 A1 11/2017 Panusopone et al.
2017/0374369 A1* 12/2017 Chuang .................. H04N 19/70
(Continued)

FOREIGN PATENT DOCUMENTS

| CN | 106464870 | 2/2017 |
|----|-----------|--------|
| JP | 2010035137 | 2/2010 |

(Continued)

OTHER PUBLICATIONS

Chen et al., Algorithm Description of Joint Exploration Test Model 7 (JEM 7), Joint Video Exploration Team (JVET) of ITU-T SG 16 WP 3 and ISO/IEC JTC 1/SC 29/WG 11, Document JVET-G1001-v1, 7th Meeting: Torino, Italy, Jul. 13, 2017, 48 pages.
(Continued)

*Primary Examiner* — Zhihan Zhou
(74) *Attorney, Agent, or Firm* — Ronald Kolczynski

(57) ABSTRACT

Template matching prediction is combined with additional coding tools to provide a robust set of coding/decoding tools by advantageous use of syntax elements. Some of the additional coding tools comprise matrix intra prediction, intra sub-partitioning, low frequency non-separable transform, multiple transform selection.

16 Claims, 14 Drawing Sheets

(51) Int. Cl.
*H04N 19/12* (2014.01)
*H04N 19/159* (2014.01)
*H04N 19/176* (2014.01)
*H04N 19/186* (2014.01)
*H04N 19/189* (2014.01)
*H04N 19/61* (2014.01)
*H04N 19/70* (2014.01)

(52) U.S. Cl.
CPC ......... *H04N 19/176* (2014.11); *H04N 19/186* (2014.11); *H04N 19/189* (2014.11); *H04N 19/70* (2014.11)

(56) References Cited

U.S. PATENT DOCUMENTS

| | | | |
|---|---|---|---|
| 2020/0021833 A1* | 1/2020 | Xu | H04N 19/176 |
| 2020/0413047 A1* | 12/2020 | Li | H04N 19/107 |
| 2021/0274214 A1* | 9/2021 | Moon | H04N 19/46 |
| 2021/0329257 A1* | 10/2021 | Sethuraman | H04N 19/119 |
| 2022/0132134 A1* | 4/2022 | Koo | H04N 19/18 |
| 2022/0150504 A1* | 5/2022 | Koo | H04N 19/159 |
| 2022/0248055 A1* | 8/2022 | Koo | H04N 19/61 |
| 2022/0272388 A1* | 8/2022 | Jang | H04N 19/70 |

FOREIGN PATENT DOCUMENTS

| | | |
|---|---|---|
| WO | 2018064517 | 4/2018 |
| WO | 2019245260 | 12/2019 |
| WO | 2020060864 | 3/2020 |
| WO | 2020118287 | 6/2020 |

OTHER PUBLICATIONS

Venugopal et al., CE8: Intra Region-Based Template Matching (Test 8.1), Joint Video Experts Team (JVET) of ITU- T SG 16 WP 3 and ISO/IEC JTC 1/SC 29/WG 11, 12th Meeting, Macao, CN, Oct. 3-12, 2018, Document: JVET-_0077_V2.

Lan et al., Intra Frame Coding With Template Matching Prediction and Adaptive Transform, 2010 17th IEEE International Conference on Image Processing (ICIP 2010), Sep. 26-29, 2010, Hong Kong, China, pp. 1221-1224.

Venugopal et al., CE8 related: Intra Region-based Template Matching (Test 8.1), 11. JVET Meeting; Jul. 11, 2018-Jul. 18, 2018; (The Joint Video Exploration Team of ISO/IEC JTC1/SC29/WG11 and ITU-T SG.16); No. JVET-K0048-v1; Jul. 2, 2018.

Boyce et al., AHG15: Proposed Interoperability Point Syntax, 12. Jvet Meeting; Oct. 3, 2018-Oct. 12, 2018; Macao; (The Joint Video Exploration Team of ISO/IEC JTC1/SC29/WG11 and ITU-T SG. 16 ), No. JVET-L0044_v1.

* cited by examiner

TEMPLATE MATCHING PREDICTION FOR VERSATILE VIDEO CODING

CROSS REFERENCE TO RELATED APPLICATIONS

This application is a U.S. National Stage Application under 35 U.S.C. 371 of International Patent Application No. PCT/EP2021/075838, filed Sep. 20, 2021, which is incorporated herein by reference in its entirety.

This application claims the benefit of European Application Nos. 20306105.6, filed Sep. 28, 2020, 20306564.4 filed Dec. 15, 2020, 21305219.4 filed Feb. 24, 2021 which is incorporated herein by reference in its entirety.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for using template matching prediction in combination with other coding tools, as in the VVC (Versatile Video Coding or H.266) standard.

According to a first aspect, there is provided a method. The method comprises steps for signaling that at least a first and a second coding tool are used on a video block; and encoding the video block using said first and second coding tools.

According to a second aspect, there is provided another method. The method comprises steps for parsing a video bitstream to determine at least a first and a second decoding tool for a video block; and decoding the video block using said at least first and second coding tool to be used on said video block.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The embodiments described here are in the field of video compression and generally relate to video compression and video encoding and decoding more specifically aims at improving the intra prediction part of video compression by employing template matching prediction. This mode generates the prediction signal from patches having similar templates within the reconstructed part of the images.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

Figure 1:
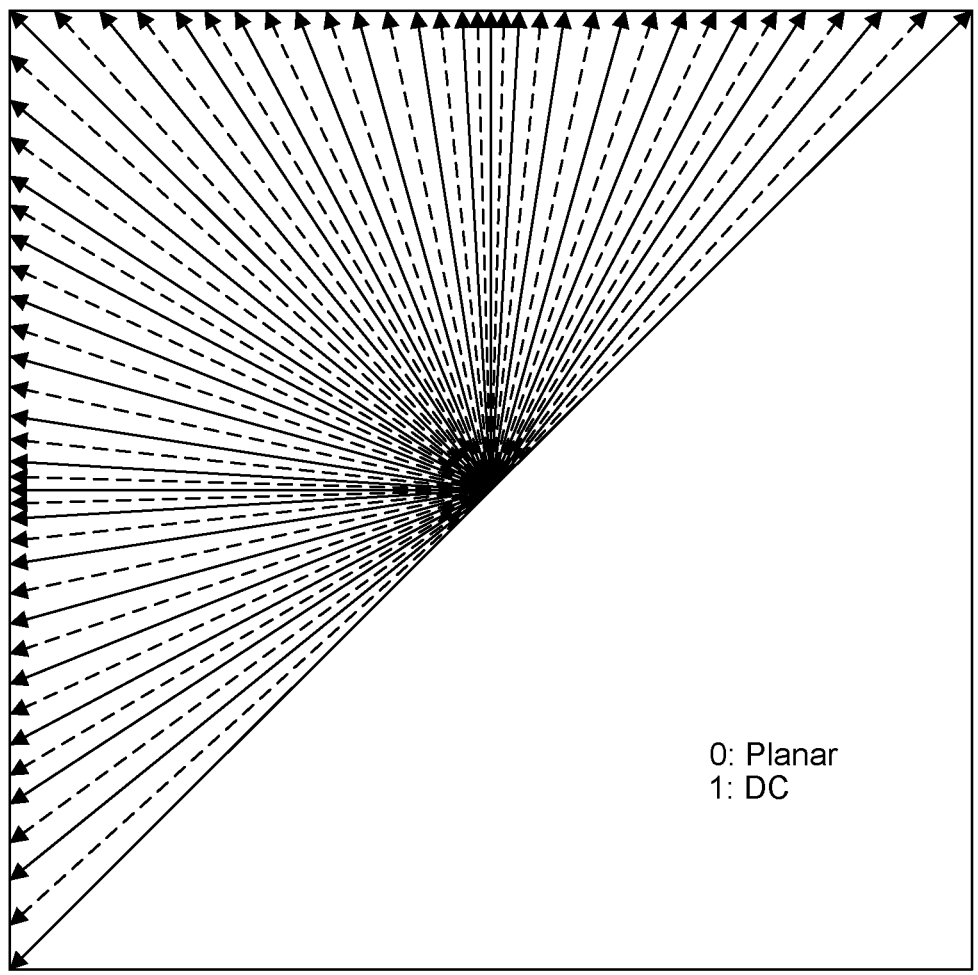
FIG. 1 illustrates intra prediction modes in Versatile Video Coding (VVC).
Figure 2:
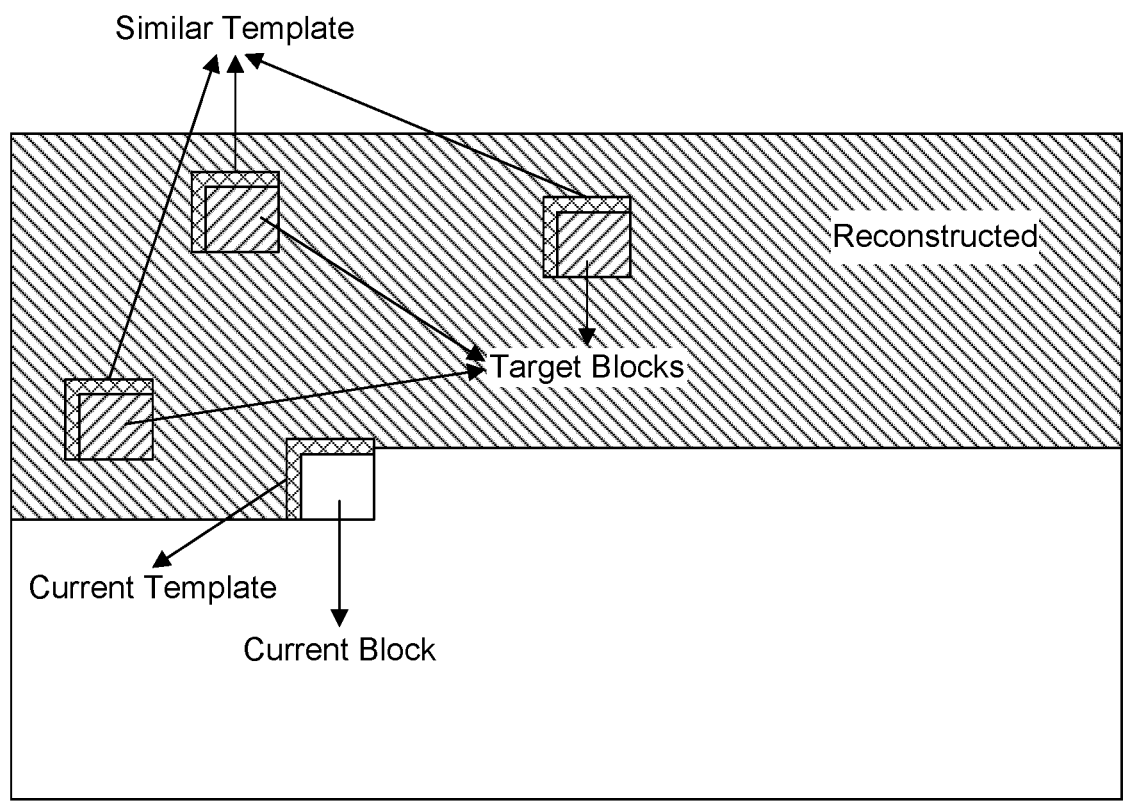
FIG. 2 illustrates an example of template matching prediction (TMP).

Intra-picture prediction is a fundamental part of image and video compression. Traditionally, the prediction signal is generated by from the L-shaped reconstructed pixels (reference samples), postulating them along different angles. This mechanism is known as angular prediction. VVC uses 65 intra prediction modes, where 63 angles and DC and planar prediction are defined (see FIG. 1).
The traditional intra prediction in VVC is enhanced with multiple tools:
  Cross-component linear model (CCLM): the chroma prediction block is generated by linear model of luma reconstructed sample.
  Multi reference line prediction (MRL): more reference samples are used to generate the prediction block.
  Intra sub-partitioning (ISP): the prediction block is split to 4 subblocks sharing the same prediction mode.
  Matrix weighted intra prediction (MIP): the prediction block is generated by multiplying the reference samples with some off-line optimized prediction matrices.
  Intra block copy (IBC): the prediction block is generated by copying another block from the already reconstructed image part, where the displacement vectors are signaled in the bit stream.

The residual block is transformed with the core transform DCT-II, or another mode of combination of DST-VII and DCT-VIII, known as multiple transform selection (MTS). The transformed block can further be transformed with a secondary non-separable transform to further compact the residual block. This process is named low-frequency non-separable transform (LFNST).

Template matching prediction (TMP) is yet another powerful intra prediction mode that is not included in VVC. It is performed by searching similar L-shaped neighborhood (named patches) to find target blocks. This is illustrated in the figure below. If TMP is used, the current template is formed by the reconstructed L-shaped neighbors. Similar templates are found that have small difference with the current template. The blocks belonging to these templates are (target blocks) are used to generate the prediction signal, either by averaging them or considering only the one that has minimum template difference.

Integrating TMP in VVC requires proper inter-operability with the existing intra tools. Namely:
  Interaction with ISP, MIP and MRL
  Interaction with transform tools (MTS and LFNST, implicit MTS)
  Interaction with combined inter and -intra prediction (CIIP)

The general aspects described herein are concerned about these interactions and propose embodiments to enable this mode for VVC.

Template matching prediction was an optional intra-prediction mode in the joint exploration test mode (JEM) of the joint video exploration team (JVET). It is accompanied by an online process for deriving the transform matrices, using Karhunen Loueve transform (KLT), using the same templates of TMP. The prediction block is generated by averaging up to 8 candidate blocks.

In the context of VVC development, a region based template matching prediction is proposed in prior works. Compared to JEM version, these prior works define smaller search areas, where an index is signaled to guide the decoder to restrict the search to the given area. This reduces the latency at the decoder side.

The general aspects described herein focus on implementing TMP in the context of VVC, where the interaction with other tools as well as the signal is proposed.

The basic idea of the general aspects described herein is to integrate TMP in VVC, where the interaction with these as defined:
  Interaction with ISP, MIP and MRL
  Interaction with transform tools (MTS and LFNST, implicit MTS)
  Interaction with combined inter and -intra prediction (CIIP)

Figure 3:
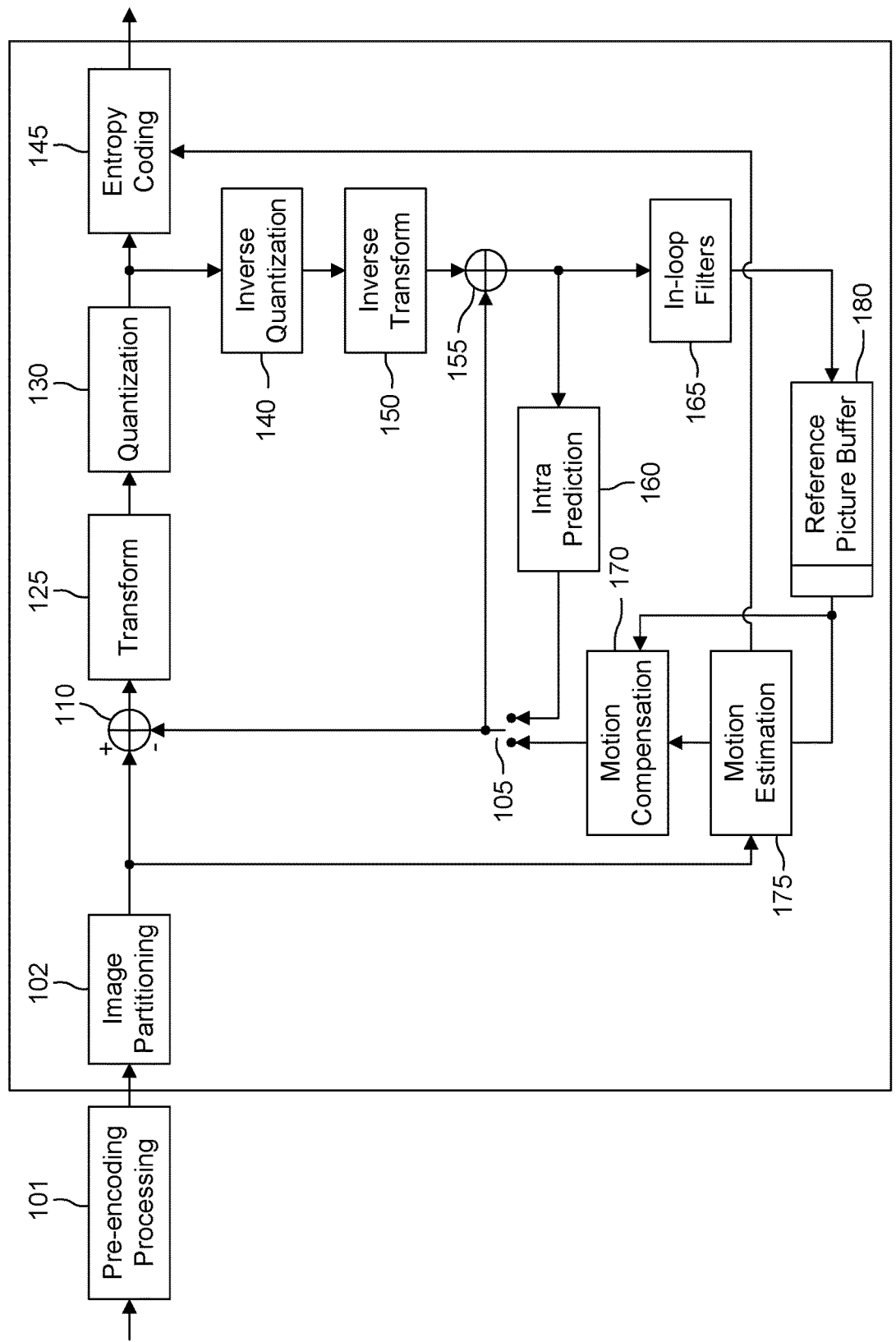
FIG. 3 shows a standard, generic video compression scheme.

The impacted encoder modules are the transform module (125) and intra prediction module (160) of FIG. 3.

Figure 4:
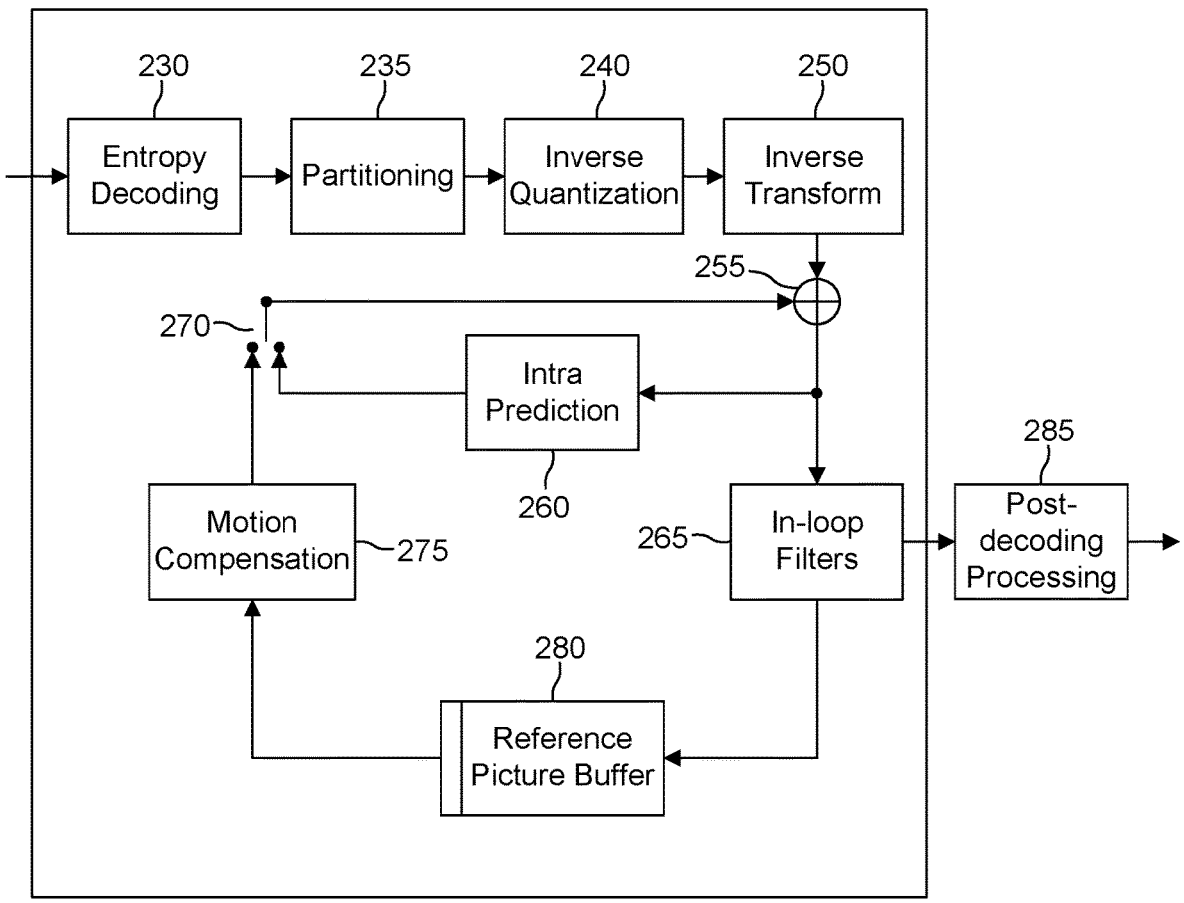
FIG. 4 shows a standard, generic video decompression scheme.

The impacted decoder modules are the inverse transform module (250) and intra prediction module (260) of FIG. 4.
Signaling of TMP Flag A CU flag is signaled to indicate the usage of TMP. This flag can be signaled at different level in the codec design. However, CU level signaling is in line with other intra tools. The current signaling in VTM is as follows:
  MIP flag (intra_mip_flag) is first signaled to indicate the usage of MIP
  If MIP is not used, MRL flag is signaled (intra_mip_flag) to indicate the usage of MRL
  If MRL is not used, ISP flag is signaled (intra_subpartitions_mode_flag) to indicate the usage of ISP
  If MRL is not used (MIP or ISP may be used), the prediction mode is further signaled.

The corresponding syntax is shown below:

| | Descriptor |
|---|---|
| coding_unit( x0, y0, cbWidth, cbHeight, cqtDepth, treeType, modeType ) { | |
| ... | |
|   if( sps_mip_enabled_flag ) | |
|     intra_mip_flag | ae(v) |
|   if( intra_mip_flag ) { | |
|     intra_mip_transposed_flag[ x0 ][ y0 ] | ae(v) |
|     intra_mip_mode[ x0 ][ y0 ] | ae(v) |
|   } else { | |
|     if( sps_mrl_enabled_flag && ( ( y0 % CtbSizeY ) > 0 ) ) | |
|       intra_luma_ref_idx | ae(v) |
|     if( sps_isp_enabled_flag && intra_luma_ref_idx = = 0 && ( cbWidth <= MaxTbSizeY && cbHeight <= MaxTbSizeY ) && ( cb Width * cbHeight > MinTbSizeY * MinTbSizeY ) && !cu_act_enabled_flag ) | |
|       intra_subpartitions_mode_flag | ae(v) |
|     if( intra_subpartitions_mode_flag = = 1 ) | |
|       intra_subpartitions_split_flag | ae(v) |
|     if( intra_luma_ref_idx = = 0 ) | |
|       intra_luma_mpm_flag[ x0 ][ y0 ] | ae(v) |
|     if( intra_luma_mpm_flag[ x0 ][ y0 ] ) { | |
|       if( intra_luma_ref_idx = = 0 ) | |
|         intra_luma_not_planar_flag[ x0 ][ y0 ] | ae(v) |
|       if( intra_luma_not_planar_flag[ x0 ][ y0 ] ) | |
|         intra_luma_mpm_idx[ x0 ][ y0 ] | ae(v) |
|     } else | |
|       intra_luma_mpm_remainder[ x0 ][ y0 ] | ae(v) |
|   } | |

...

For TMP, the following considerations are taken:
- MIP should not be signaled, as MIP cannot be used with TMP
- MRL should not be signaled, as MRL cannot be used with TMP
- Intra prediction mode should not be signaled, as TMP has no mode to be signaled.

ISP can be used with TMP, where each subpartition uses different matching templates.

Therefore, TMP flag can be signaled before MIP flag such that if used all the other the flags are not signaled it is inferred to be zero. The corresponding change is as follows (added parts are italics):

| | Descriptor |
|---|---|
| coding_unit( x0, y0, cbWidth, cbHeight, cqtDepth, treeType, modeType ) { | |
| ... | |
| *if (sps_TMP_enabled flag && cbWidth <= MaxTMPSize && cbHeight <= MaxTMPSize)* | |
| *intra_TMP_flag* | *ue(v)* |
| *else{* | |
| if( sps_mip_enabled_flag ) | |
| intra_mip_flag | ae(v) |
| if( intra_mip_flag ) { | |
| intra_mip_transposed_flag[ x0 ][ y0 ] | ae(v) |
| intra_mip_mode[ x0 ][ y0 ] | ae(v) |
| } else { | |
| if( sps_mrl_enabled_flag && ( ( y0 % CtbSizeY ) > 0 ) ) | |
| intra_luma_ref_idx | ae(v) |
| if( sps_isp_enabled_flag && intra luma ref_idx == 0 && | |
| ( cbWidth <= MaxTbSizeY && cbHeight <= MaxTbSizeY ) && | |
| ( cbWidth * cbHeight > MinTbSizeY * MinTbSizeY ) && | |
| !cu_act_enabled_flag ) | |
| intra_subpartitions_mode_flag | ae(v) |
| if( intra_subpartitions_mode_flag == 1) | |
| intra_subpartitions_split_flag | ae(v) |
| if( intra_luma_ref_idx == 0) | |
| intra_luma_mpm_flag[ x0 ][ y0 ] | ae(v) |
| if( intra_luma_mpm_flag[ x0 ][ y0 ] ) { | |
| if( intra_luma_ref_idx == 0) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| *}* | |
| ... | |

Where sps_TMP_enabled_flag is an SPS level flag to activate TMP and intra_TMP_flag is a CU level flag to signal the usage of TMP. MaxTMPSize is the maximum allowed dimension for TMP. Either fixed or signaled at SPS level.

In this method, ISP and TMP cannot be used together. This can be changed to allow the combination. It is done by signaling TMP flag next to ISP flag, either before or after. It should be only signaled when MRL and MIP are not used. The following modifications are made:

| | Descriptor |
|---|---|
| coding_unit( x0, y0, cbWidth, cbHeight, cqtDepth, treeType, modeType ) { | |
| ... | |
| if( sps_mip_enabled_flag ) | |
| intra_mip_flag | ae(v) |
| if( intra_mip_flag ) { | |
| intra_mip_transposed_flag[ x0 ][ y0 ] | ae(v) |
| intra_mip_mode[ x0 ][ y0 ] | ae(v) |
| } else { | |
| if( sps_mrl_enabled_flag && ( ( y0 % CtbSizeY ) > 0 ) ) | |
| intra_luma_ref_idx | ae(v) |
| *if (sps_TMP_enabled_flag && cbWidth <= MaxTMPSize && cbHeight <= MaxTMPSize && intra_luma_ref_idx == 0)* | |
| *intra_TMP_flag* | *ue(v)* |
| if( sps_isp_enabled_flag && intra_luma ref_idx == 0 && | |
| ( cbWidth <= MaxTbSizeY && cbHeight <= MaxTbSizeY ) && | |
| ( cbWidth * cbHeight > MinTbSizeY * MinTbSizeY ) && | |
| !cu_act_enabled_flag ) | |

| | Descriptor |
|---|---|
|     intra_subpartitions_mode_flag | ae(v) |
|     if( intra_subpartitions_mode_flag = = 1) | |
|         intra_subpartitions_split_flag | ae(v) |
|     if( intra_luma_ref_idx = = 0 && intra_TMP_flag = 0) | |
|         intra_luma_mpm_flag[ x0 ][ y0 ] | ae(v) |
|     if( intra_luma_mpm_flag[ x0 ][ y0 ]) { | |
|         if( intra_luma_ref_idx == 0) | |
|             intra_luma_not_planar_flag[ x0 ][ y0 ] | ae(v) |
|         if( intra_luma_not_planar_flag[ x0 ][ y0 ] ) | |
|             intra_luma_mpm_idx[ x0 ][ y0 ] | ae(v) |
|     } else if intra_TMP flag = 0 | |
|         intra_luma_mpm_remainder[ x0 ][ y0 ] | ae(v) |
| } | |
| ... | |

It should be noted that for both method, additional syntax can be signaled in case of region based template matching prediction. This is signaled just after signal intra_TMP_flag.

In addition to the SPS flag, a general constraint flag may be defined for TMP. This is similar to most coding tools of VVC that have higher level flag to indicate if they are deactivated. The following flag can be added to the specification:

| | Descriptor |
|---|---|
| general_constraints_info( ) { | |
|   gci_present_flag | u(1) |
|   if( gci_present_flag ) { | |
|   /* general */ | |
|     gci_intra_only_constraint_flag | u(1) |
|     gci_all_layers_independent_constraint_flag | u(1) |
|     gci_one_au_only_constraint_flag | u(1) |
|   /* picture format */ | |
|     gci_sixteen_minus_max_bitdepth_constraint_idc | u(4) |
|     gci_three_minus_max_chroma_format_constraint_idc | u(2) |
|   /* NAL unit type related */ | |
|   ... | |
|   ... | |
|     gci_no_tmp_constraint_flag | 1 |

Where gci_no_tmp_constraint_flag, when equal to one, indicates that sps_TMP_enabled_flag is equal to 0.

Interaction with Transform Tools:

TMP can be allowed with MTS and/or LFNST. However, LFNST depends on the intra prediction mode for the selection of the transform kernel. The same approach of MIP can be used. That is, for transform matrix selection, MIP is considered as planar intra prediction. Therefore, TMP can also be considered this way. That is, when TMP is used, the LFNST transform kernels corresponding to planar modes are used.

Additionally, since LFNST is used for chroma components, the prediction mode is required for selecting the transform matrix. Specifically, for CCLM, the prediction mode is considered as planar mode if MIP is used for the luma component. The same is done here if TMP is used for the luma component.

For MTS, there is a special mode known as implicit MTS, in which the MTS flag is not signaled but transform selection is deduced from the block dimensions. However, the transform selection for MIP mode or LFNST is DCT-II. The same is also used for TMP.

The corresponding change to the working draft is as follows:

---

8.7.4 Transformation process for scaled transform coefficients
8.7.4.1 General

---

Inputs to this process are:
- a luma location ( xTbY, yTbY ) specifying the top-left sample of the current luma transform block relative to the top-left luma sample of the current picture,
- a variable nCbW specifying the width of the current coding block,
- a variable nCbH specifying the height of the current coding block,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0 ... nTbW − 1, y = 0 ... nTbH − 1.

Output of this process is the (nTbW)x(nTbH) array res[ x ][ y ] of residual samples with x = 0 ... nTbW − 1, y = 0 ... nTbH − 1.

When ApplyLfnstFlag[ cIdx ] is equal to 1 and transform_skip_flag[ xTbY ][ yTbY ][ cIdx ] is equal to 0, the following applies:
- The variables predModeIntra, nLfnstOutSize, log2LfnstSize, nLfnstSize, and nonZeroSize are derived as follows:

predModeIntra = ( cIdx = = 0 ) ? IntraPredModeY[ xTbY ][ yTbY ] : IntraPredModeC[ xTbY ][ yTbY ]   (1147)

nLfnstOutSize = ( nTbW >= 8 && nTbH >= 8 ) ? 48 : 16   (1148)

log2LfnstSize = ( nTbW >= 8 && nTbH >= 8 ) ? 3 : 2   (1149)

nLfnstSize = 1 << log2LfnstSize   (1150)

nonZeroSize=( ( nTbW = = 4 && nTbH = = 4 ) | | (nTbW = = 8 && nTbH = = 8 ) ) ? 8 : 16   (1151)

- When IntraMipFlag[ xTbY ][ yTbY ] is equal to 1, or IntraTMPFlag[ xTbY ]

-continued 8.7.4 Transformation process for scaled transform coefficients
8.7.4.1 General

[ yTbY ] is equal to 1, and cIdx is equal to 0, predModeIntra is set equal to
INTRA_PLANAR.
- When predModeIntra is equal to either INTRA_LT_CCLM, INTRA_L_CCLM,
  or INTRA_T_CCLM, predModeIntra is derived as follows:
  - If IntraMipFlag[ xTbY + nTbW * SubWidthC / 2 ][ yTbY + nTbH * SubHeightC / 2 ], or
    IntraTMPFlag[ xTbY + nTbW * SubWidthC / 2 ][ yTbY+ nTbH * SubHeightC / 2] is equal to 1, , is
    equal to 1, predModeIntra is set equal to INTRA_PLANAR.
  - Otherwise, if CuPredMode[ 0 ][ xTbY + nTbW * SubWidthC / 2 ][ yTbY + nTbH * SubHeightC / 2 ]
    is equal to MODE_IBC or MODE_PLT, predModeIntra is set equal to INTRA_DC.
  - Otherwise,        predModeIntra      is     set     equal     to
    IntraPredModeY[ xTbY + nTbW * SubWidthC / 2 ][ yTbY + nTbH * SubHeightC / 2 ].
- The wide angle intra prediction mode mapping process as specified in subclause 8.4.5.2.7 is invoked
  with predModeIntra, nCbW, nCbH, nTbW, nTbH and cIdx as inputs, and the modified predModeIntra as
  output.
- The values of the list u[ x ] with x = 0 . . . nonZeroSize − 1 are derived as follows:
    xC = DiagScanOrder[ 2 ][ 2 ][ x ][ 0 ]     (1152)
    yC = DiagScanOrder[ 2 ][ 2 ][ x ][ 1 ]     (1153)
    u[ x ] = d[ xC ][ yC ]                     (1154)
- The one-dimensional low frequency non-separable transformation process as specified in subclause
  8.7.4.2 is invoked with the input length of the scaled transform coefficients nonZeroSize, the transform
  output length nTrS set equal to nLfnstOutSize, the list of scaled non-zero transform coefficients u[ x ] with
  x = 0 . . . nonZeroSize − 1, and the intra prediction mode for LFNST set selection predModeIntra as inputs,
  and the list v[ x ] with x = 0 . . . nLfnstOutSize − 1 as output.
- The array d[ x ][ y ] with x = 0 . . . nLfnstSize − 1, y = 0 . . . nLfnstSize − 1 is derived as follows:
  - If predModeIntra is less than or equal to 34, the following applies:
      d[ x ][ y ] = ( y < 4 ) ? v[ x + ( y << log2LfnstSize ) ] :   (1155)
              ( ( x < 4 ) ? v[ 32 + x + ( ( y − 4 ) << 2) ] : d[ x ][ y ] )
  - Otherwise, the following applies:
      d[ x ][ y ] = ( x < 4 ) ? v[ y + ( x << log2LfnstSize ) ] :   (1156)
              ( ( y < 4 ) ? v[ 32 + y + ( ( x − 4 ) << 2 ) ] : d[ x ][ y ] )
The variable implicitMtsEnabled is derived as follows:
- If sps_mts_enabled_flag is equal to 1 and one or more of the following conditions are true,
  implicitMtsEnabled is set equal to 1:
  - IntraSubPartitionsSplitType is not equal to ISP_NO_SPLIT
  - cu_sbt_flag is equal to 1 and Max( nTbW, nTbH ) is less than or equal to 32
  - sps_explicit_mts_intra_enabled_flag is equal to 0 and CuPredMode[ 0 ][ xTbY ][ yTbY ] is equal to
    MODE_INTRA and lfnst_idx is equal to 0 and IntraMipFlag[ x0 ][ y0 ] is equal to 0 and
    IntraTMPFlag[ x0 ][ y0 ] is equal to 0
- Otherwise, implicitMtsEnabled is set equal to 0.

To reduce the encoder run time, MTS can be disallowed with TMP. That is, when TMP is used as prediction mode, the encoder does not try all possible MTS modes (DCT-II, DST-VII and DCT-VIII) and does not signal any information to the decoder. Instead, fixed transform selection can be employed. The first choice is to use DCT-II for vertical and horizontal direction. Another choice is to employ the implicit transform selection that is used for ISP mode. That is, the vertical and horizontal transforms are selected as follows:

TrHor=Width<=16? DST7:DCT2
TrVer=Height<=16? DST7:DCT2

Interaction with MPM

Most probable mode (MPM) is an effective way of signaling the intra prediction mode. MPM list generation requires the knowledge of the current prediction mode. If TMP is used, it can be considered as planar mode for MPM list generation.

TMP for Luma and Chroma Components

Generally, TMP is used for luma components only. However, it can be extended to use luma and chroma components. To allow this, the following options are used:
  Single flag is used to signal the usage of TMP for both luma and chroma components
  The template matching is performed only on luma components, and the same position of matching block is used for chroma components (with appropriate scaling according to chroma formation, e.g. 4:2:0). This is to reduce the complexity by avoiding the search repetition on all components.

Interaction with CIIP

CIIP is a prediction mode that combines both intra and inter prediction. The intra part is planar mode and the inter part is regular merge mode. TMP can be used to replace the intra prediction part (planar mode).

The weighting of the two prediction signal can be also modified. Currently, depending on the neighboring coding units, the weights are defined as follows:

- If the top neighbor is available and intra coded, then set isIntraTop to 1, otherwise set
  isIntraTop to 0;
- If the left neighbor is available and intra coded, then set isIntraLeft to 1, otherwise set
  isIntraLeft to 0;
- If (isIntraLeft + isIntraTop) is equal to 2, then wt is set to 3;
- Otherwise, if (isIntraLeft + isIntraTop) is equal to 1, then wt is set to 2;
- Otherwise, set wt to 1.
The CIIP prediction is formed as follows:
    $P_{CIIP} = ((4 - wt) * P_{inter} + wt * P_{intra} + 2) >> 2$ Instead, an equal weighting of inter and intra part can be used instead:

Interaction with IBC

In many cases, the usage of both TMP and IBC is not useful since both perform intra prediction by searching within the reconstructed part of the image. Therefore, it is proposed that both IBC and TMP should not be activated together. This can be done by conditioning their SPS flags on each other. That is, if the SPS flag of IBC is 1, SPS flag of TMP shall be inferred to zero. The other way around is also possible: if the SPS flag of TMP is 1, the SPS flag of IBC shall be inferred to zero.

An example of such method is given in the syntax table below (conditioning TMP on IBC):

|  | Descriptor |
| --- | --- |
| seq_parameter_set_rbsp( ) { | |
| ... | |
| sps_ibc_enabled_flag | u(1) |
| if( sps_ibc_enabled_flag ) | |
| sps_six_minus_max_num_ibc_merge_cand | ue(v) |
| ... | |
| if (sps_ibc_enabled_flag = = 0) | |
| sps_TMP_enabled_flag | u(1) |
| ... | |
| } | |

Another Example (Conditioning IBC on TMP):

|  | Descriptor |
| --- | --- |
| seq_parameter_set_rbsp( ) { | |
| ... | |
| sps_TMP_enabled_flag | u(1) |
| ... | |
| if (sps_TMP_enabled_flag = = 0) | |
| sps_ibc_enabled_flag | u(1) |
| if( sps_ibc_enabled_flag ) | |
| sps_six_minus_max_num_ibc_merge_cand | ue(v) |
| ... | |
| } | |

Figure 5:
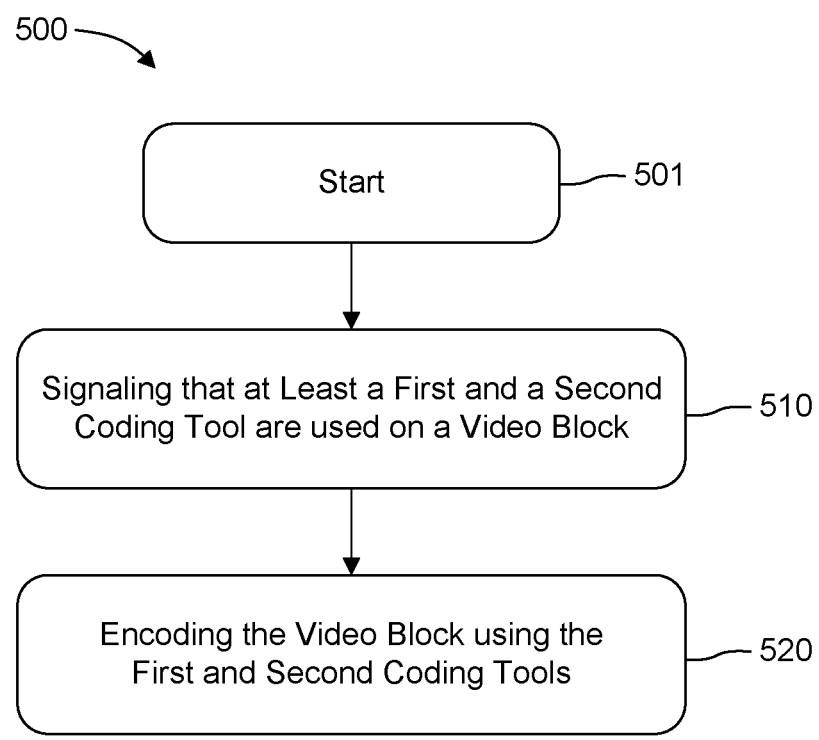
FIG. 5 shows one embodiment of a method under the general described aspects.

One embodiment of a method 500 under the general aspects described here is shown in FIG. 5. The method commences at start block 501 and control proceeds to block 510 for signaling that at least a first and a second coding tool are used on a video block. Control proceeds from block 510 to block 520 for encoding the video block using said first and second coding tools.

Figure 6:
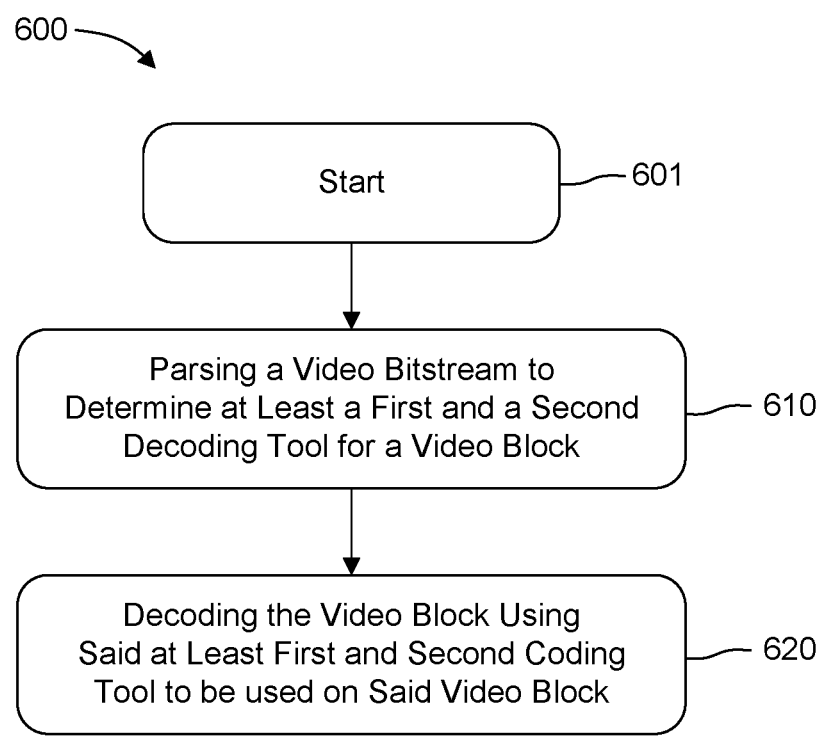
FIG. 6 shows another embodiment of a method under the general described aspects.

One embodiment of a method 600 under the general aspects described here is shown in FIG. 6. The method commences at start block 601 and control proceeds to block 610 for parsing a video bitstream to determine at least a first and a second decoding tool for a video block. Control proceeds from block 610 to block 620 for decoding the video block using said at least first and second coding tool to be used on said video block.

Figure 7:
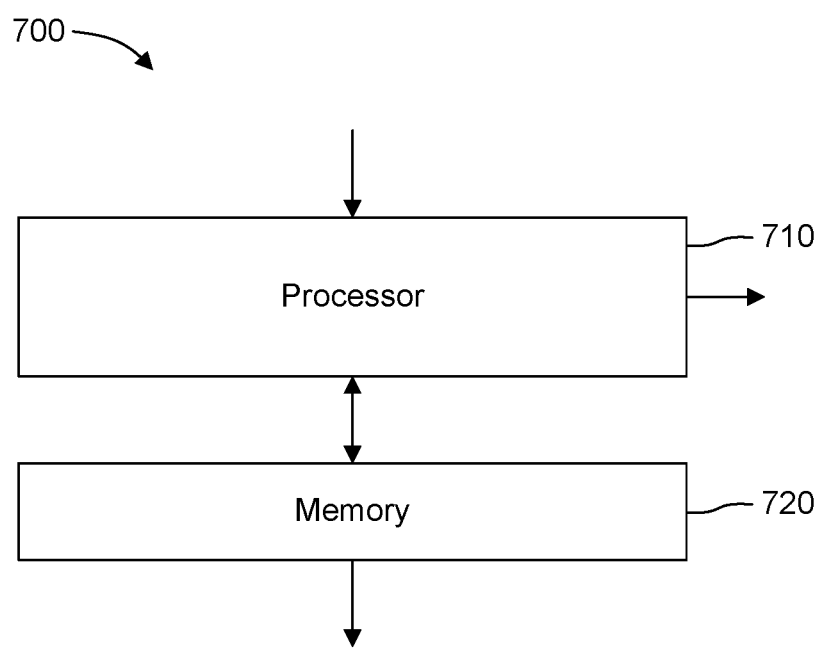
FIG. 7 shows an example apparatus under the described aspects.

FIG. 7 shows one embodiment of an apparatus 700 for encoding, decoding, compressing or decompressing video data using simplifications of coding modes based on neighboring samples dependent parametric models. The apparatus comprises Processor 710 and can be interconnected to a memory 720 through at least one port. Both Processor 710 and memory 720 can also have one or more additional interconnections to external connections.

Processor 710 is also configured to either insert or receive information in a bitstream and, either compressing, encoding or decoding using any of the described aspects.

Single Template Prediction

Figure 9:
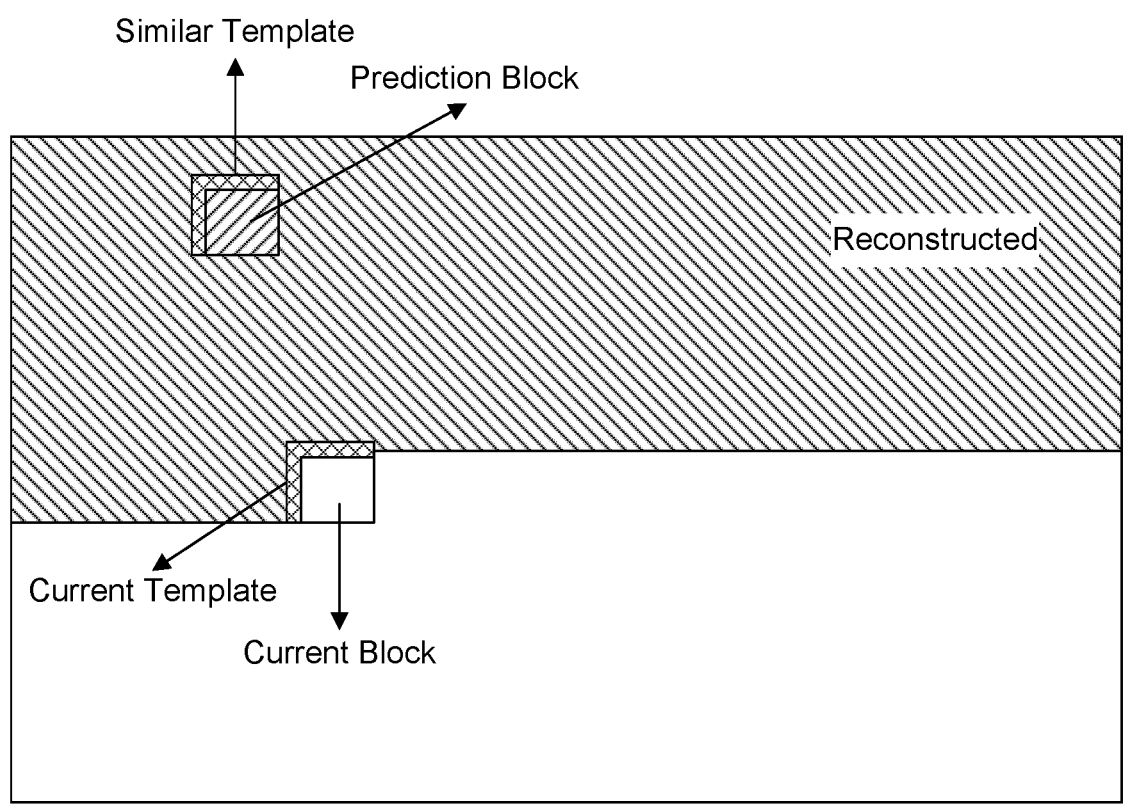
FIG. 9 shows an example of template matching with single template.

It is observed that single matching block provides the best compression efficiency. That is, instead of searching for N similar templates, one similar template is found and used as prediction signal. The process is illustrated in FIG. 9.

Variable Search Range

Figure 10:
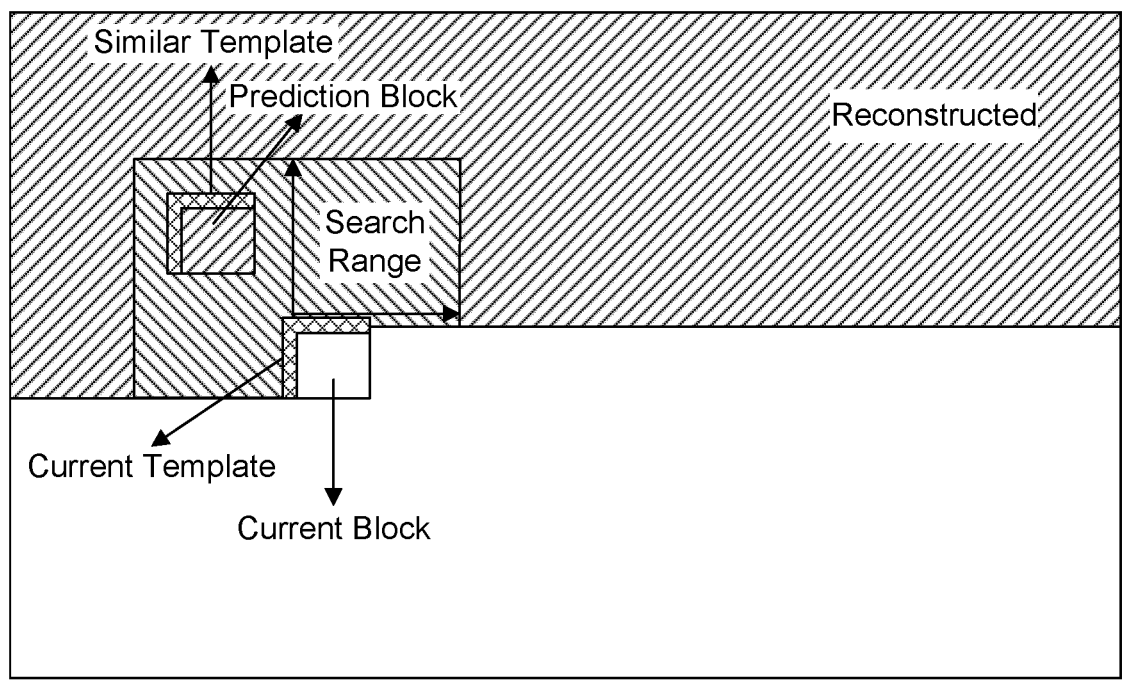
FIG. 10 shows an example of template matching prediction with smaller search range.

The search range for finding the optimal matching template (templates) can be set as variable or fixed. The maximum coding gain, associated with maximum complexity, is when the full range is used. That is, the template is found within the whole reconstructed part of the current frame. However, to reduce complexity, a smaller search range can be used. An example is shown in FIG. 10.

It is been found that the maximum coding gain can be achieved with search range equal to 1024. However, for video sequences with small resolution, smaller search ranges can be used. It is also found that a search range of 64 has reasonable trade-off between complexity and gain. Therefore, in this embodiment, we define search range to be either: 64, 128, 256, 1024 or full. A high level syntax element can be used to signal the value of search range.

Search Range within CTU

The search range can be allowed inside the current CTU. That is, when the current block (PU/CU) is inside a larger CTU, the prediction candidates can be searched inside a CTU as well as outside a CTU. However, not all parts inside the CTU are decoded, and therefore cannot be used as prediction candidates.

Figure 12:
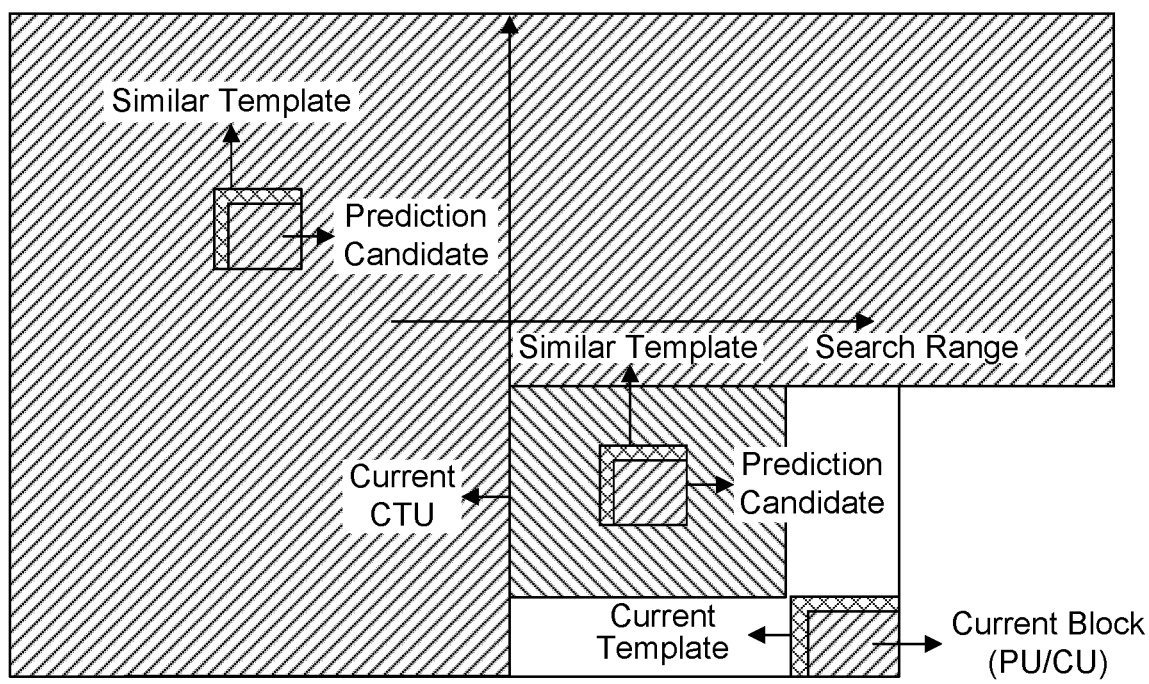
FIG. 12 shows a search range allowed inside a current CTU.

To allow the search within the current CTU, only candidates located up-left the current block are used. This is indicated in the FIG. 12. The darker search range is inside the current CTU where all pixels are decoded and reconstructed. The search range outside CTU is also used, and the best candidate, which has the least template difference is used as prediction block.

Template Matching CABAC-Context Derivation

To signal the flag of template matching, a proper context derivation for CABAC must be used. In this embodiment, we follow the same as for MIP. This is to be consistent with the design of VVC. Four contexts are used:
1—Initialize the context with zero
2—If left CU uses template matching prediction, add one
3—If above CU uses template matching prediction, add one
4—If the width is greater than 2 times the height, or the height is greater than 2 times the width, set the context as 3

That is, the four categories are:
1—Neighbor CU's are not using TMP
2—One neighbor CU is using TMP
3—Two neighbor CU's are using TMP
4—CU shape is elongated in one dimension.

A similar method can be used where the 4th context is not used.

Variable Maximum Size

The maximum CU size that uses TMP can be variable. It is found that up to 16×16 CU provide the most coding gain with reduced the complexity. The value of maximum dimension can be signaled with a high level syntax element, or can be kept as 16.

Removed Redundant Signaling

The signaling of a TMP flag can be redundant as in some cases it is known that TMP cannot be used. An example of this is when the CU size is larger than the maximum allowed size for TMP, when considering the previous embodiment (Variable Maximum Size), or when there is not enough reconstructed parts to search for similar templates. For example, for CU of size 64×64, and the reconstructed part is less than 64×64 plus the size of the template, TMP cannot be used and therefore its flag shall not be signaled but inferred to be zero.

Search Range Outside the Current CTU

The search range can be simplified to not include the current CTU. It is observed that there is no improved coding gain by including the current CTU in the search range. Therefore, as a simplification step, it is proposed to remove this area from the search range.

SIMD Optimization

The run time can be reduced by employing SIMD for computing the template difference. That is, the difference between the pixels of two templates can be made in parallel via SIMD optimization.

Figure 13:
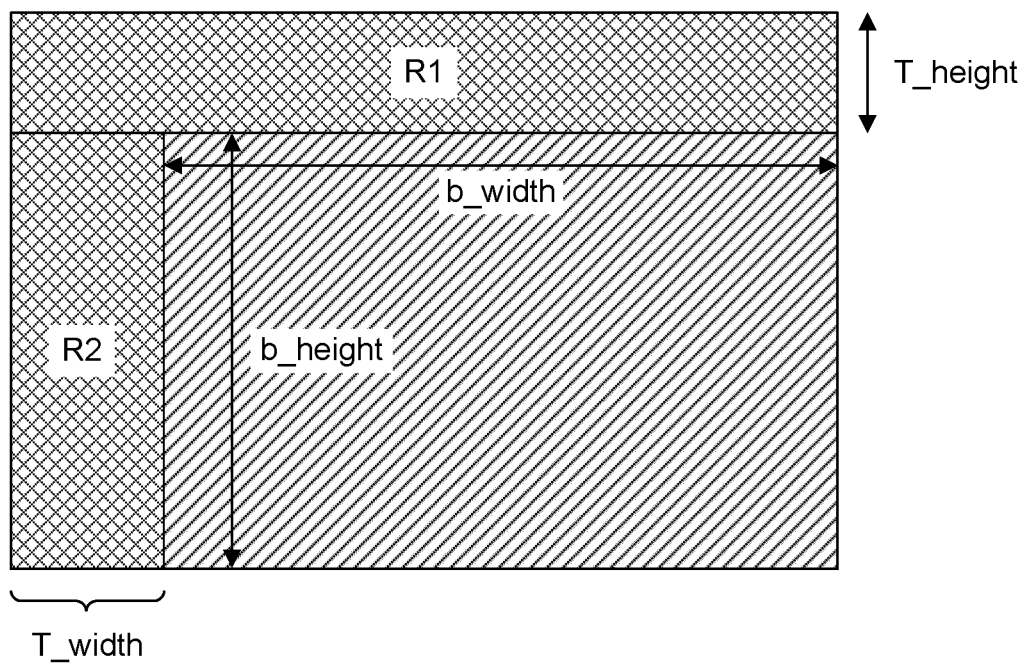
FIG. 13 shows SIMD optimization with the line width of R1 and R2 being multiple of 4.

For SIMD operation, it is required that each line of comparison is a multiple of 4. In FIG. 13, the block dimension (b_width and b_height) are assumed to be always multiple of 4, since in VVC the block sizes are multiple of 4. Therefore, in order to have multiple of 4 comparison, the line width of R1 and R2 (FIG. 13) must be multiple of 4:

1—R1: b_width+t_width must be multiple of 4. Therefore, t_width must be multiple of 4
 2—R2: T_width must be multiple of 4. Therefore, T_width must be multiple of 4

Figure 14:
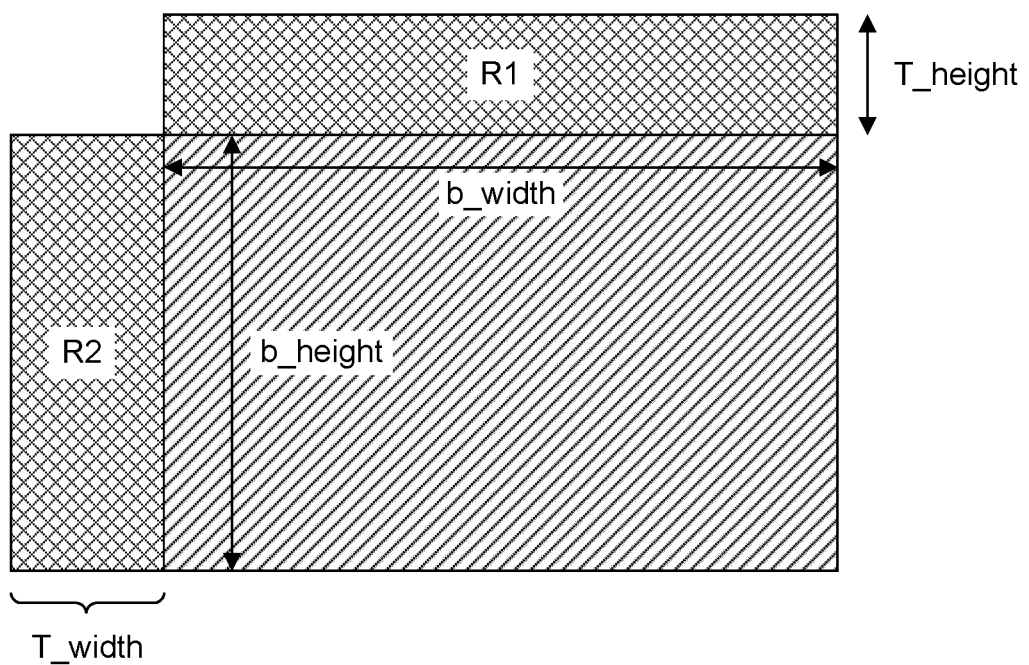
FIG. 14 shows SIMD optimization with the template upper left part removed to have the same dimension as the current block.

Otherwise, the template upper left part is removed to have the same dimension as the current block. This is shown in FIG. 14.

By doing so, R1 width is equal to b_width (always multiple of 4) and R2 is transposed before computing the difference and eventually will have a width of b_heigh (always multiple of 4). This method provides SIMD optimization regardless of the template size.

Mutual Excluded Search Range for IBC and TMP

In this embodiment, IBC and TMP use different reference regions. Typically, IBC uses one CTU area as a reference. So TMP should use the rest of the already reconstructed picture as reference.

In the case of CTU of size 32×32 or 64×64, IBC may use more than one CTU area as reference, but always on the same CTU line as the current coding unit, and in this case TMP should use all the reconstructed picture except the current CTU line as a reference.

Figure 11:
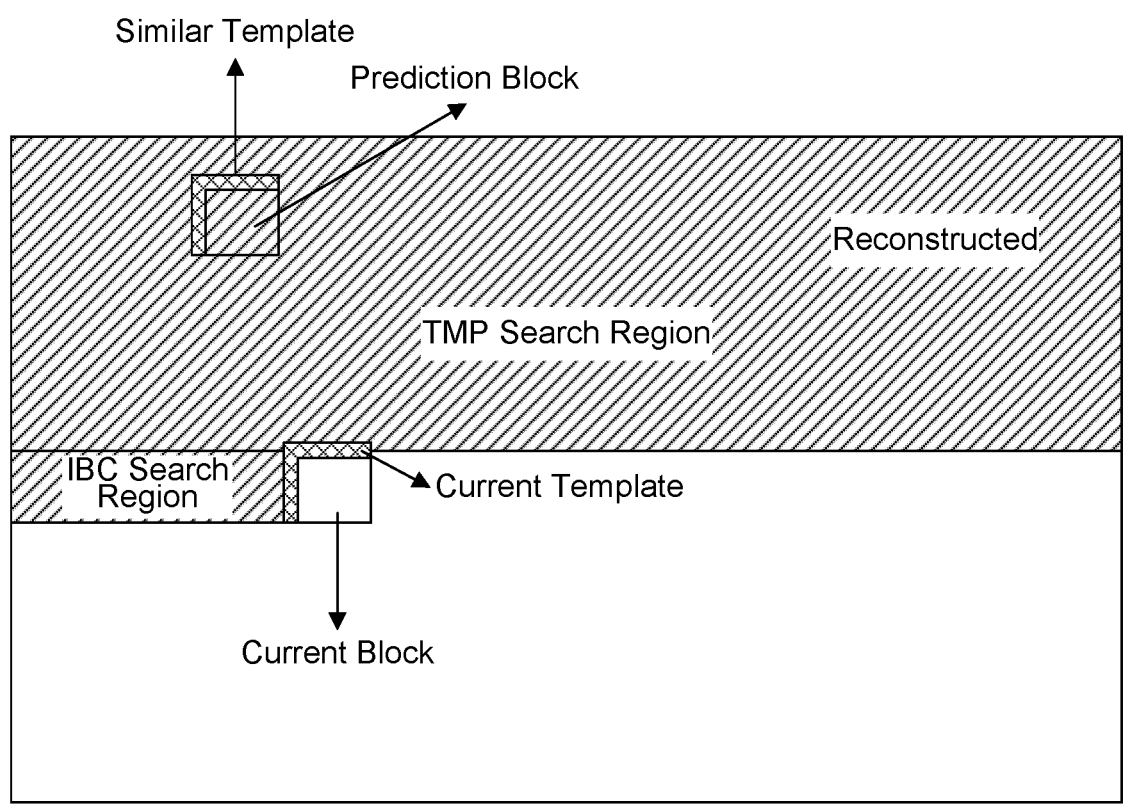
FIG. 11 shows an example of a mutually exclusive search range for IBC and TMP.

An example of a mutually exclusive search range for IBC and TMP is shown in FIG. 11.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 8:
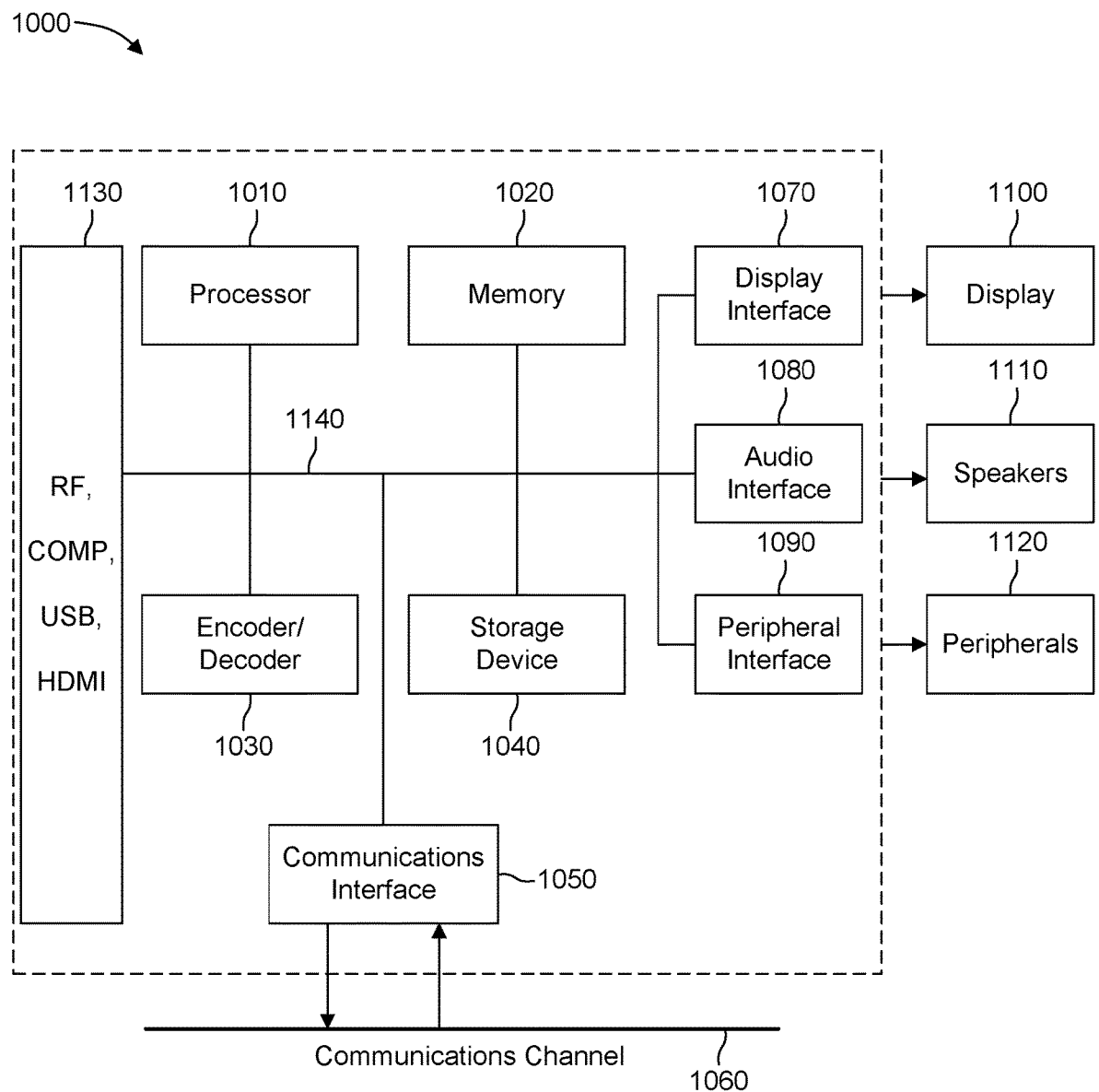
FIG. 8 shows a processor based system for encoding/decoding under the general described aspects.

The aspects described and contemplated in this application can be implemented in many different forms. FIGS. 3, 4, and 8 provide some embodiments, but other embodiments are contemplated and the discussion of FIGS. 3, 4, and 8 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 3 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 4 illustrates a block diagram of a video decoder 200. In the decoder 200, a bitstream is decoded by the decoder elements as described below. Video decoder 200 generally performs a decoding pass reciprocal to the encoding pass as described in FIG. 3. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 8 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable: Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 8, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding sections describe a number of embodiments, across various claim categories and types. Features of these embodiments can be provided alone or in any combination. Further, embodiments can include one or more of the following features, devices, or aspects, alone or in any combination, across various claim categories and types:

Signaling that at least a first and a second coding tool can be used on a video block; and encoding the video block using said first and second coding tools.

Parsing a video bitstream to determine at least a first and a second decoding tool for a video block; and decoding the video block using said at least first and second coding tool to be used on said video block.

Either of the above embodiments with a first coding/decoding tool comprising template matching prediction and a second coding/decoding tool comprising one of matrix intra prediction, intra sub-partitioning, low frequency non-separable transform, multiple transform selection, and intra sub-partitioning.

Any of the above embodiments using a single matching block to use as a prediction signal.

Any of the above embodiments using a variable or fixed search range.

Any of the above embodiments with a context derivation for CABAC that signals a flag of template matching.

Any of the above embodiments with a coding unit with size that uses TMP can be variable.

Any of the above embodiments with redundant signaling removed.

Any of the above embodiments with a search rang outside a current Coding Tree Unit.

Any of the above embodiments with IBC and TMP using different reference regions.

Using a general constraint flag for TMP to indicate deactivation.

Using TMP where LFNST transform kernels corresponding to planar modes are used.

Disallowing multiple transform selection with template matching prediction.

Using TMP for luma and chroma components, wherein syntax is used to signal use of TMP for both luma and chroma components.

Using template matching on luma components with a same position of matching block used for chroma components.

Allowing prediction candidates inside and outside a coding tree unit.

Using SIMD for computation of template differences.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
signaling that at least a first and a second coding tool are used on a video block; and
encoding the video block using said at least first and second coding tool on said video block wherein template matching prediction is used on a luma component of said video block and one or more LFNST transform kernels corresponding to planar modes are used on a chroma component of said video block, and transform used is DCT-II, disallowing multiple transform selection with template matching prediction.

2. The method of claim 1, wherein a general constraint flag is used for TMP to indicate deactivation.

3. The method of claim 1, wherein TMP is used where LFNST transform kernels corresponding to planar modes are used.

4. An apparatus, comprising:
a processor, configured to:
signal that at least a first and a second coding tool are used on a video block; and
encode the video block using said at least first and second coding tool on said video block wherein template matching prediction is used on a luma component of said video block and one or more LFNST transform kernels corresponding to planar modes are used on a chroma component of said video block, and transform used is DCT-II, disallowing multiple transform selection with template matching prediction.

5. The apparatus of claim 4, wherein TMP is used for luma and chroma components, and syntax is used to signal use of TMP for both luma and chroma components.

6. The apparatus of claim 4, wherein template matching is used on luma components with a same position of matching block used for chroma components.

7. The apparatus of claim 4, wherein
prediction candidates from inside and outside a coding tree unit are allowed.

8. The apparatus of claim 4, wherein an SIMD scheme is used for computation of template differences.

9. A method, comprising:
parsing a video bitstream to determine at least a first and a second decoding tool for a video block; and
decoding the video block using said at least first and second coding tool on said video block wherein template matching prediction is used on a luma component of said video block and one or more LFNST transform kernels corresponding to planar modes are used on a chroma component of said video block, and transform used is DCT-II, disallowing multiple transform selection with template matching prediction.

10. The method of claim 9, wherein a general constraint flag is used for TMP to indicate deactivation.

11. The method of claim 9, wherein TMP is used where LFNST transform kernels corresponding to planar modes are used.

12. An apparatus, comprising:
a processor, configured to:
parse a video bitstream to determine at least a first and a second decoding tool for a video block; and
decode the video block using said at least first and second coding tool on said video block wherein template matching prediction is used on a luma component of said video block and one or more LFNST transform kernels corresponding to planar modes are used on a chroma component of said video block, and transform used is DCT-II, disallowing multiple transform selection with template matching prediction.

13. The apparatus of claim 12, wherein TMP is used for luma and chroma components, and syntax is used to signal use of TMP for both luma and chroma components.

14. The apparatus of claim 12, wherein template matching is used on luma components with a same position of matching block used for chroma components.

15. The apparatus of claim 12, wherein
prediction candidates from inside and outside a coding tree unit are allowed.

16. The apparatus of claim 12 wherein an SIMD scheme is used for computation of template differences.

* * * * *